United States Patent
West et al.

(10) Patent No.: US 8,931,687 B2
(45) Date of Patent: Jan. 13, 2015

(54) TECHNIQUES FOR OPTIMIZATION OF BARCODES

(75) Inventors: Graham West, Edinburgh (GB); Murray Stewart Tait, West Linton (GB)

(73) Assignee: NCR Corporation, Duluth, GA (US)

( * ) Notice: Subject to any disclaimer, the term of this patent is extended or adjusted under 35 U.S.C. 154(b) by 158 days.

(21) Appl. No.: 13/222,147

(22) Filed: Aug. 31, 2011

(65) Prior Publication Data

US 2013/0048739 A1 Feb. 28, 2013

(51) Int. Cl.
*G06F 17/00* (2006.01)
*G06K 19/06* (2006.01)
*G06K 7/10* (2006.01)

(52) U.S. Cl.
CPC ........ *G06K 19/06112* (2013.01); *G06K 7/1095* (2013.01)
USPC ........................ 235/375; 235/494; 235/462.01

(58) Field of Classification Search
CPC .......... G06K 19/06112; G06K 7/1095; G06Q 20/3274; H04M 2017/2568; G06F 17/30879
USPC ..................................... 235/375, 494, 462.01
See application file for complete search history.

(56) References Cited

U.S. PATENT DOCUMENTS

| | | | | |
|---|---|---|---|---|
| 6,134,583 | A * | 10/2000 | Herriot | 709/217 |
| 6,448,958 | B1 * | 9/2002 | Muta | 345/169 |
| 6,685,093 | B2 * | 2/2004 | Challa et al. | 235/462.46 |
| 6,726,104 | B2 * | 4/2004 | Schuessler et al. | 235/462.09 |
| 6,982,729 | B1 * | 1/2006 | Lange et al. | 345/660 |
| 7,257,545 | B1 * | 8/2007 | Hung | 705/14.26 |
| 7,909,243 | B2 * | 3/2011 | Merkow et al. | 235/379 |
| 2003/0047613 | A1 * | 3/2003 | Funamoto et al. | 235/462.01 |
| 2004/0019628 | A1 * | 1/2004 | Puri et al. | 709/203 |
| 2004/0137886 | A1 * | 7/2004 | Ross et al. | 455/414.1 |
| 2005/0283448 | A1 * | 12/2005 | Dixon et al. | 705/408 |
| 2006/0055693 | A1 * | 3/2006 | Sylthe et al. | 345/419 |
| 2006/0056604 | A1 * | 3/2006 | Sylthe et al. | 379/100.13 |
| 2007/0290499 | A1 * | 12/2007 | Tame | 283/70 |
| 2008/0133366 | A1 * | 6/2008 | Evans et al. | 705/14 |
| 2010/0125497 | A1 * | 5/2010 | Arguello | 705/14.33 |
| 2010/0149187 | A1 * | 6/2010 | Slavin et al. | 345/441 |
| 2010/0268659 | A1 * | 10/2010 | Zimberoff et al. | 705/336 |
| 2011/0210170 | A1 * | 9/2011 | Arguello | 235/380 |
| 2012/0067944 | A1 * | 3/2012 | Ross | 235/375 |
| 2012/0136708 | A1 * | 5/2012 | Chang et al. | 705/14.23 |
| 2012/0182320 | A1 * | 7/2012 | Beals et al. | 345/655 |
| 2012/0191613 | A1 * | 7/2012 | Forbes et al. | 705/67 |

(Continued)

FOREIGN PATENT DOCUMENTS

JP 2008076989 A * 4/2008

OTHER PUBLICATIONS

Knorr et al., "What cloud computing really means". InfoWorld (http://www.infoworld.com). Apr. 7, 2008. 4 pages.*

*Primary Examiner* — Michael G Lee
*Assistant Examiner* — Suezu Ellis
(74) *Attorney, Agent, or Firm* — Joseph P. Merhle

(57) ABSTRACT

Techniques for optimization of barcode processing are presented. Barcode configuration data is distributed from a server service to a mobile client device. The mobile client device includes an application to inspect the capabilities of mobile client device and render the barcode configuration data into a barcode that is optimally scanned from the mobile client device when presented on a display of the mobile client device.

19 Claims, 3 Drawing Sheets

(56) References Cited

U.S. PATENT DOCUMENTS

2012/0280029 A1* 11/2012 Simske et al. ............... 235/375
2012/0329386 A1* 12/2012 Reyner ........................ 455/41.1
2013/0147845 A1* 6/2013 Xie et al. ..................... 345/660

* cited by examiner

TECHNIQUES FOR OPTIMIZATION OF BARCODES

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention. Individuals also perform transactions online and are capable of using their smart phones to check out of stores.

Some transactions, via mobile phones or other portable devices, also require security with delivery of secure content from an enterprise to a customer. For example, automated processing of boarding passes from airlines requires direct delivery of the boarding pass from the airlines to the phone, laptop, or tablet of a customer.

Often this secure content is represented as a barcode, the barcode distributed to a smart phone of a user and the user presents the barcode to complete a transaction, such as entry to an airport gate, entry to an event, and the like. The barcode is an image that is scanned to reveal specific information to a barcode reading device.

The problem with barcode processing is that the barcode is rendered to an image by a server based on predefined settings for a particular smart phone and then distributed to the smart phone as an image. The predefined settings may not accurately reflect the capabilities and specific configuration of a user's smart phone so that the barcode is sometimes not capable of being scanned from the smart phone.

In addition, the server that provides the rendering of a barcodes to mobile devices can become loaded when multiple users are simultaneously requesting barcodes. Moreover, the network connections to and from the server can become bottlenecked with bandwidth issues because the transmission of image data is voluminous.

SUMMARY

In various embodiments, techniques for optimization of barcodes are presented. According to an embodiment, a method for barcode optimization is discussed.

Specifically, barcode control information is received from a barcode distributor. Next, image and resolution settings and capabilities are dynamically and in real time acquired from a device. Finally, the barcode control information is translated into a barcode image on the device for access from the device based on the image and resolution settings and capabilities.

DETAILED DESCRIPTION

The aforementioned industry problems are resolved by providing data to a client-side application that can be used to render a barcode. The client-side application processes on a mobile device of a user and renders the barcode based on the data provided and based on dynamically resolved capabilities of the user's mobile device.

The techniques herein transfer optimization processing of barcode rendering from the server-side to the client-side. To achieve this, a raw barcode (a version not capable of being scanned) is transmitted in an un-optimized form to a mobile device of a user, such as a mobile phone, laptop, and/or tablet.

As discussed herein there are a few ways to achieve the client-side barcode rendering.

First, the barcode may be transmitted in a vector format (rather than a traditional raster format). This allows logic in a Web page at the client-side mobile device to scale the barcode image based on a scaling factor. The scaling factor can be calculated by a script on the Web page that interrogates the user's mobile device to find out what screen size and/or resolution settings that the mobile device has.

Second, the Web page may contain the data that is to be encoded in the barcode (rather than the barcode image itself). The Web page can also include scripting utilities that describe how to render the barcode based on the capabilities of the user's mobile device. The barcode data that is transmitted may include the syntax and semantics that are to be used. Alternatively, the barcode data may include a sequence of bits indicative of whether each square should be black or white. The script on the Web page can then render the barcode based on a scaled version of the black/white sequence pattern optimized for the user's mobile device.

Transferring the processing of barcode rendering from a server-side processing module to client-side processing module avoids the need for a rules database for mobile devices on a server and potentially results in less data to transfer over the network and less server-side processing power.

Figure 1:
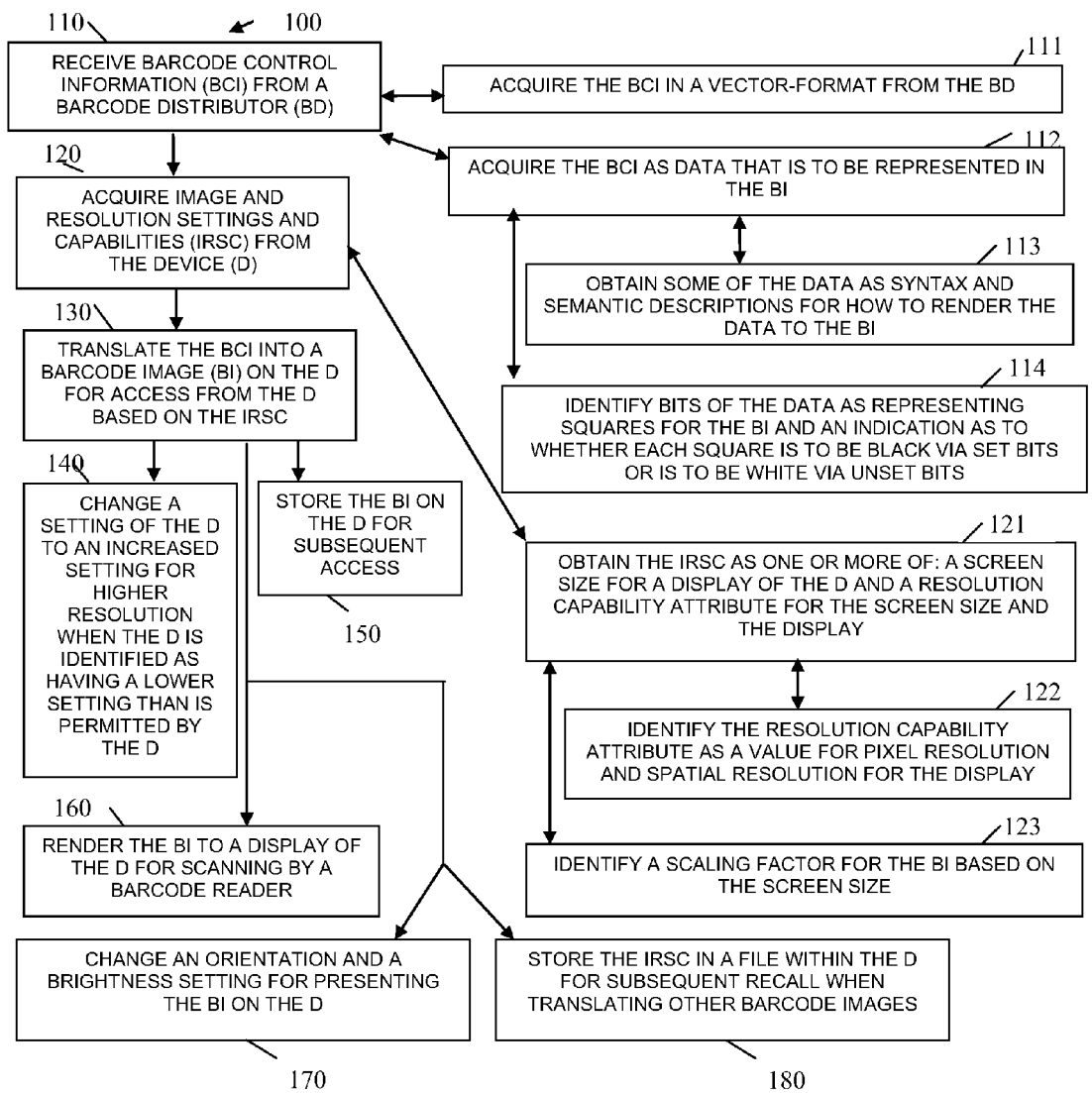
FIG. 1 is a diagram of method for barcode optimization, according to an example embodiment.

FIG. 1 is a diagram of method 100 for barcode optimization, according to an example embodiment. The method 100 (hereinafter "client barcode renderer") is implemented as instructions and programmed within a non-transitory computer-readable (processor-readable) storage medium that executes on one or more processors of a mobile device (such as a mobile phone, a laptop, a tablet, and the like), the processors of the mobile device are specifically configured to execute the client barcode renderer. The client barcode renderer may be operational over a network; the network is wireless or a combination of wired and wireless. In an embodiment, the network is the Internet, a Wi-Fi network, a cellular network, a Bluetooth network, a satellite network, other types of networks, or the network is a combination or all of these networks.

The processing of the client barcode renderer is presented from the perspective of an agent that processes as an application on a user's mobile device to render barcodes. Conventionally, barcodes are rendered from a server and pushed to the user's mobile device, which is less than ideal in many situations. Here, the client barcode renderer processes on a user's mobile device and dynamically renders barcodes for the user based on capabilities and settings for the mobile device to optimize the barcode that is rendered on the mobile device.

In an embodiment, the client barcode renderer is a browser application that is pushed to and executes on the mobile device from within a browser of the mobile device. In such a case, it may be that a server provides the barcode control data in a format that can be interpreted by standards, such as scalable vector graphics and the like.

As used herein, "optimization" refers to customizing barcode image details based on capabilities and/or configuration settings of a particular user's mobile device.

At 110, the client barcode renderer receives barcode control information from a barcode distributer. Example processing associated with a barcode distributer is presented below with reference to the FIG. 2. The barcode control information is not a barcode and is not image data that is capable of being scanned; rather, the data is in a format that can be translated on the device (mobile device that is also processing the client barcode renderer) into a barcode image that then can be read or scanned by a barcode reader/scanner from a display of the device.

According to an embodiment, at 111, the client barcode renderer acquires the barcode control information in a vector format from the barcode distributer (discussed with reference to the FIG. 2 below).

In another case, at 112, the client barcode renderer acquires the barcode control information as data that is to be represented in the barcode image.

So, continuing with the embodiment of 112 and at 113, the client barcode renderer obtains some of the data as syntactical and semantic descriptions for describing how the client barcode renderer is to render the data to the barcode image.

In another scenario of 112 and at 114, the client barcode renderer identifies bits of the data as representing squares of predefined pixel sizes. An indication as to whether a particular square is to be black is identified via set bits or was to whether a particular square is to be white is identified via unset bits.

At 120, the client barcode renderer acquires image and resolution settings and capabilities from the device. This is the same device that the client barcode renderer is processing on and is a mobile device of the user, such as a mobile phone, a laptop, a tablet and the like.

According to an embodiment, at 121, the client barcode renderer obtains the image and resolution settings and capabilities as one or more of: a screen size for a display of the device and a resolution capability attribute for the screen size and the display.

Continuing with the embodiment of 121 and at 122, the client barcode renderer identifies the resolution capability attribute as a value for pixel resolution and spatial resolution for the display.

In still another case, of 121 and at 123, the client barcode renderer identifies a scaling factor for the barcode image based on the screen size and resolution for the display of the device.

It is noted that the client barcode renderer can utilize existing application programming interface (API) commands of an operating system (OS) for the device to acquire existing settings and for acquiring device capabilities with respect to image processing. Alternatively, another application that has access for acquiring these values can be used by the client barcode renderer to obtain the values. In such a case, the client barcode renderer interacts with an API of that application.

At 130, the client barcode renderer translates the barcode control information into a barcode image on the device for access from the device, via a display of the device, based on the image resolution settings and capabilities.

It is noted that a setting is viewed as a value that a user currently has the device configured for whereas a capability is a limit for an image attribute value that the device is capable of handling. In this manner, each user's existing settings can be inspected to tailor the translation of the barcode image for optimal scanning on the device.

According to an embodiment, at 140, the client barcode renderer changes a setting of the device to an increased setting for higher resolution when the device is identified as having a lower setting than is permitted by the device. Here, the user has the device configured for a lower image processing resolution than the device is capable of handling and the client barcode renderer changes the device setting to increase resolution of the barcode image being translated. It may also be that the client barcode renderer can reset the setting back to a lower resolution once the barcode image is translated and/or presented to a barcode scanner/reader.

In one scenario, at 150, the client barcode renderer stores the barcode image on the device for subsequent access. That is, the barcode image may not be immediately needed by the user or may be used multiple times by the user. Therefore, the client barcode renderer can store the barcode image for retrieval on the device as needed.

In yet another situation, at 160, the client barcode renderer renders the barcode image to a display of the device for scanning by a barcode reader/scanner.

In an embodiment, at 170, the client barcode renderer changes an orientation and a brightness setting for presenting the barcode image on the device. This can be done when the barcode image is being rendered to the display of the device for reading/scanning.

In still another case, at 180, the client barcode renderer stores the image resolution settings and capabilities in a file within the device for subsequent recall when translating other barcode images. This can be useful as so that subsequent barcode translations do not require reacquiring the image resolution settings and capabilities.

Figure 2:
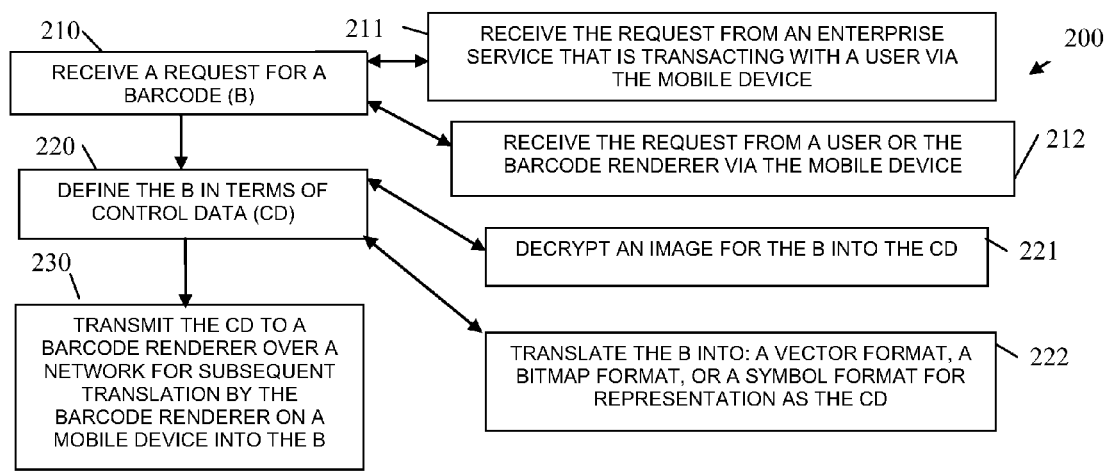
FIG. 2 is a diagram of another method for barcode optimization, according to an example embodiment.

FIG. 2 is a diagram of another method 200 for barcode optimization, according to an example embodiment. The method 200 (hereinafter "barcode distributer") is implemented as instructions and programmed within a non-transitory computer-readable (processor-readable) storage medium that executes on one or more processors of a server (such as a cloud processing environment), the processors of the server are specifically configured to execute the barcode distributer. The barcode distributer is operational over a network; the network is wireless or a combination of wired and wireless. In an embodiment, the network is the Internet, a Wi-Fi network, a cellular network, a Bluetooth network, other types of networks, a satellite network, or the network is a combination or all of these networks.

In an embodiment, the barcode distributer describes processing actions from the perspective of a specific server that is interacting with the client barcode render described above with reference to the FIG. 1. So, in an embodiment, the barcode distributer interacts with the client barcode render represented by the method 100 of the FIG. 1 and discussed in detail above.

At 210, the barcode distributer receives a request for a barcode. This can occur in a few different manners.

For example, at 211, the barcode distributer receives the request from an enterprise service that is transaction with a user via a mobile device.

In another situation, at 212, the barcode distributer receives the request from a user or a barcode renderer, such as the barcode renderer described above with reference to the FIG. 1.

At 220, the barcode distributer defines the barcode in terms of control data. That is, the barcode control data is not image data that can be scanned and it is the barcode control data that is a barcode renderer over the network not a barcode image.

According to an embodiment, at 221, the barcode distributer decrypts an image for the barcode into the control data.

In another case, at 222, the barcode distributer translates the barcode into: a vector format, a bitmap format, or a symbol format for representation as the control data.

At 230, the barcode distributer transmits the control data to a barcode renderer over a network for subsequent translation by the barcode renderer on a mobile device into the barcode. This subsequent translation was discussed above with reference to the FIG. 1.

Figure 3:
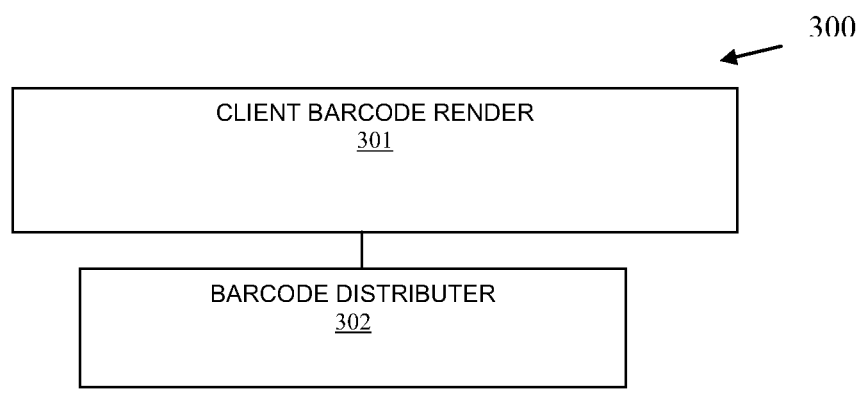
FIG. 3 is a diagram of barcode optimization system, according to an example embodiment.

FIG. 3 is a diagram of barcode optimization system 300, according to an example embodiment. The barcode optimization system 300 includes one or more processors that are specifically configured to perform, inter alia, the processing associated with the methods 100 and 200 of the FIGS. 1 and 2, respectively. Furthermore, the barcode optimization system 300 is operational over a network and the network can be wireless or a combination of wired and wireless. In an embodiment, the network is the Internet. In another case, the network is a cellular network. In yet another situation, the network is a satellite network. In still another case, the network is a Wi-Fi network, Bluetooth network, or other type of network. It may also be that the network uses all or a combination of: the Internet, cellular network, Bluetooth network, Wi-Fi network, other type of network, and/or satellite network.

The barcode optimization system 300 includes a client barcode render 301 and a barcode distributer 302. Each of these and their interactions with one another will now be discussed in turn.

The barcode render 301 is implemented, programmed, and resides within a non-transitory processor-readable storage medium and executes on a mobile device (first machine) of a consumer. Example processing associated with the barcode render 301 was presented above in detail with respect to the FIG. 1.

The barcode render 301 is configured to interact with the barcode distributer 302 to acquire barcode control data. Again, the barcode control data is not a barcode and cannot be scanned or read by a barcode scanner/reader.

The barcode render 301 is also configured to obtain image resolution and settings for the first machine of the barcode render 301 for purposes of tailoring and customizing the translation of the barcode control data into a barcode that can be scanned or read by a barcode scanner/reader from a display of the first machine.

The barcode distributer 302 processes on a physical machine or a Virtual Machine (VM) (second machine) and is operational over a network. That is, the barcode distributer 302 is implemented, resides, and programmed within a non-transitory processor-readable medium as executable instructions that a processor-enabled device executes. In some cases, the barcode distributer 302 is accessible via one or more cloud processing environments. Example processing associated with the barcode distributer 302 was presented above with reference to the FIG. 2.

The barcode distributer 302 is configured to package and distribute the barcode control data to the barcode renderer 301 over a network.

According to an embodiment, the first machine is a mobile phone of a user and the second machine is located in a cloud processing environment over the network.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on a device configured to execute the method, comprising:
    receiving barcode control information from a barcode distributor;
    acquiring current image and current resolution settings from the device and acquiring limits on capabilities from the device for image and resolution settings by using an Application Programming Interface (API) for an Operating System (OS) of the device; and
    translating the barcode control information into a barcode image on the device for access from the device by changing the current image and current resolution settings within the limits and once the barcode image is read by a barcode reader, resetting the device back to the current image and the current resolution settings.

2. The method of claim 1, wherein receiving further includes acquiring the barcode control information in a vector-format from the barcode distributor.

3. The method of claim 1, wherein receiving further includes acquiring the barcode control information as data that is to be represented in the barcode image.

4. The method of claim 3, wherein acquiring the barcode control information further includes obtaining some of the data as syntax and semantic descriptions for how to render the data to the barcode image.

5. The method of claim 3, wherein acquiring the barcode control information further includes identifying bits of the data as representing squares for the barcode and an indication as to whether each square is to be black via set bits or is to be white via unset bits.

6. The method of claim 1, wherein acquiring further includes obtaining with the current image and the current resolution settings, the limits as being one or more of: a dimensions for a display of the device and a resolution capability attribute for use with the dimensions of the display.

7. The method of claim 6, wherein obtaining further includes identifying the resolution capability attribute as a value for pixel resolution and spatial resolution for the display.

8. The method of claim 6, wherein obtaining further includes identifying a scaling factor for the barcode image based on the dimensions of the display.

9. The method of claim 1, wherein changing the current resolution setting includes increasing the current resolution setting to a resolution that is higher than the current resolution.

10. The method of claim 1 further comprising, storing the barcode image on the device for subsequent access.

11. The method of claim 1 further comprising, rendering the barcode image to a display of the device so that the barcode image is read by the barcode reader.

12. The method of claim 11 further comprising, changing an orientation and a brightness setting for presenting the barcode image.

13. The method of claim 1 further comprising, storing the limits in a file within the device for subsequent recall when translating other barcode images.

14. A processor-implemented method programmed in a non-transitory processor-readable medium and to execute on one or more processors configured to execute the method, comprising:
receiving a request for a barcode;
defining the barcode in terms of control data; and
transmitting the control data to a barcode renderer over a network for translation by the barcode renderer on a mobile device into the barcode, the barcode renderer using an Application Programming Interface (API) of an Operating System (OS) for the mobile device to determine how to render the barcode on the mobile device based on a current image resolution setting for a display of the mobile device, a limit for an image resolution that the mobile device is capable of handling, and a scaling factor for the display based on a screen size for the display, wherein the barcode renderer resets the mobile device back to a lower resolution once the barcode is presented to a barcode reader, when the barcode renderer increases the current image resolution setting for the display to render the barcode.

15. The method of claim 14, wherein receiving further includes receiving the request from an enterprise service that is transacting with a user via the mobile device.

16. The method of claim 14, wherein receiving further includes receiving the request from a user or the barcode renderer via the mobile device.

17. The method of claim 14, wherein defining further includes translating the barcode into: a vector format, a bitmap format, or a symbol format for representation as the control data.

18. A system, comprising:
a first machine having a client barcode renderer implemented in a non-transitory computer-readable storage medium, the client barcode renderer executed on the first machine; and
a second machine having a barcode distributer implemented in a non-transitory computer-readable storage medium, the barcode distributer executed on the second machine;
the client barcode renderer configured to interact with the barcode distributer to acquire barcode control data, which is not data that can be scanned as a particular barcode by a barcode reader, the barcode renderer further configured to obtain current image resolution setting for a display of the first machine along with a limit for resolution that the display is capable of achieving and a scaling factor based on a screen size for the display by using an Application Programming Interface (API) for an Operating System (OS) of the first machine and the barcode renderer to translate the barcode control data into a barcode that can be scanned from the barcode reader, and the barcode renderer to increase resolution of the first machine when rendering the barcode and reset resolution of the first machine back to the current image resolution when the barcode is read by the barcode reader, and wherein the barcode distributer configured to package and distribute the barcode control data to the barcode renderer over a network.

19. The system of claim 18, wherein the first machine is a mobile phone of a user and the second machine is located in a cloud processing environment.

* * * * *